(12) United States Patent
Li et al.

(10) Patent No.: US 6,323,994 B1
(45) Date of Patent: Nov. 27, 2001

(54) WDM SYSTEM EQUALIZATION WITH EDFA OPTICAL AMPLIFIERS

(75) Inventors: Jinghui Li, Nepean; Suet Yuen, Kanata, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/289,733

(22) Filed: Apr. 12, 1999

(51) Int. Cl.[7] .............................. H04J 14/02; H01S 3/00
(52) U.S. Cl. .................. 359/341.1; 359/124; 359/341.2; 359/341.41; 359/341.42
(58) Field of Search ..................... 359/341, 124, 359/341.1, 341.2, 341.41, 341.42

(56) References Cited

U.S. PATENT DOCUMENTS 6,055,092 * 4/2000 Sugaya et al. .................. 359/337
6,088,152 * 7/2000 Berger et al. .................. 359/334

* cited by examiner

Primary Examiner—Stephen C. Buczinski

(57) ABSTRACT

An in-line repeater implemented within a Wavelength Division Multiplexed (WDM) optical fiber communication system is shown that includes an attenuator. The communication system includes a WDM multiplexer that transmits a WDM signal including a series of WDM channels, via the in-line repeater, to a demultiplexer that separates the WDM channels into a series of output signals. Within the in-line repeater, the attenuator is coupled between two stages of a single amplifier in order to aid in the power equalization of the WDM channels at the demultiplexer. The addition of the attenuator results in the powers and OSNR of the individual WDM channels becoming closer in value, hence reducing the time and the dynamic range of transmitter power adjustments required for traditional methods to equalize the channels' powers.

21 Claims, 8 Drawing Sheets

WDM SYSTEM EQUALIZATION WITH EDFA OPTICAL AMPLIFIERS

FIELD OF THE INVENTION

This invention relates generally to Wavelength Division Multiplexed (WDM) systems and more specifically to equalization within a WDM system using Erbium-Doped Fiber Amplifier (EDFA) optical amplifiers.

BACKGROUND OF THE INVENTION

The use of erbium-doped fiber amplifier technology is increasing within optical fiber communication systems in a wide range of applications in which weak optical signals require amplification. These applications include, but are not limited to, preamplifiers, postamplifiers, and in-line repeaters in optical fiber communication systems.

Also within current optical fiber technology, there is a growing requirement to increase the capacity of the existing communication systems. According to current technology, an increase in capacity can be achieved by increasing the bit rate and/or by adding wavelength division multiplexed (WDM) channels. As a result of the need for more capacity, the use of WDM channels and further, an increased number of such channels are becoming increasingly popular.

FIG. 1 illustrates a typical unidirectional optical fiber communication system in which first and second optical fibers 102,104 couple a wavelength division multiplexer 106 at a first location to a wavelength division demultiplexer 108 at a second location which is remote from the first location. The multiplexer 106 is used to wavelength division multiplex a series of channels ($\lambda 1-\lambda N$) and the demultiplexer 108 is used to subsequently demultiplex the WDM channels. As depicted within FIG. 1, coupled between the multiplexer 106 and the first fiber 102 is an EDFA postamplifier 110 and coupled between the second fiber 104 and the demultiplexer 108 is an EDFA preamplifier 112. Further, as depicted within FIG. 1, coupled between the fibers 102,104 is an in-line repeater which comprises an EDFA optical amplifier 114. One skilled in the art would understand that further line-repeaters could also be utilized in such an implementation. This setup is a well understood unidirectional optical fiber communication system.

One major problem in such an implementation as disclosed in FIG. 1 is the non-uniform wavelength dependent gain profile of the EDFA amplifier 114 within the in-line repeater and further within any other EDFA optical fiber amplifiers that may be included between the multiplexer 106 and the demultiplexer 108 such as the post/preamplifiers 110,112. These problems, inherent to the currently utilized EDFA optical fiber amplifiers, result in each channel within a particular WDM system having a different optical gain and a different resulting Optical Signal to Noise Ratio (OSNR). Hence, some channels could have a relatively low OSNR and low received power which, in turn, could result in an excessively high bit error rate.

Considerable efforts are being expended in order to equalize the received powers and OSNRs of the individual WDM channels at the demultiplexer 108 and therefore ensure that all channels have corresponding OSNRs that are above a predetermined allowable threshold level. One technique to equalize the received powers between the channels ($\lambda 1-\lambda N$) is to add Variable Optical Attenuators (VOAs) for each channel directly after the demultiplexer 108, so that, within a certain range, the received powers can be adjusted to a common value. Although effective in reducing the difference in received powers, the implementation of these VOAs does not reduce the differences between OSNRs of the individual channels ($\lambda 1-\lambda N$).

A technique that is utilized to reduce the difference in received powers and OSNRs between the WDM channels at the demultiplexer 108 is disclosed in U.S. Pat. No. 5,225,922 entitled "Optical Transmission System Equalizer" by Chraplyvy et al, issued on Jul. 6, 1993 and assigned to AT&T Bell Laboratories of Murray Hill, NJ. With this technique, a controller detects the power of the optical signals of each individual channel at each amplifier with use of a series of power detectors and subsequently adjusts the transmission power corresponding to each of the channels at the multiplexer 106 with use of a series of transmission power adjusters. The controller, input with the detected powers, operates to adjust the transmission power for each channel in order to compensate for the non-uniform gain problems caused by the optical fiber amplifiers. Hence, any channels with a low OSNR will have their corresponding transmission power increased while any channels with a high OSNR will have their transmission power reduced. Eventually, this feedback technique will equalize the power corresponding to the received optical signals on all the channels, ensuring that all channels have satisfactory OSNRs and also limiting unnecessary transmission power.

There are a number of key problems with this technique for equalizing the OSNRs corresponding to the individual WDM channels. For one, this feedback technique typically requires numerous iterations, and therefore a considerable amount of time, to complete. This is especially true as the number of channels increase. Secondly, this technique must allow for the transmission power for the individual WDM channels to be adjustable over a large dynamic range. As the dynamic range increases, the complexity and cost of the transmission power adjusters required within the multiplexer 106 also increase.

It can be seen that the unidirectional system of FIG. 1 can be expanded to a typical bidirectional optical fiber communication system as depicted in FIG. 2. This system comprises first and second optical fibers 202,204 coupled between first and second WDM couplers 206,208, each coupler operating as a red and blue band splitter. Further coupled to the first WDM coupler 206 is a blue band signal multiplexer 210 and a red band signal demultiplexer 212, while further coupled to the second WDM coupler 208 is a red band signal multiplexer 214 and a blue band signal demultiplexer 216. The multiplexers 210,214 are used, similar to that for the multiplexer 106 within FIG. 1, to wavelength division multiplex a series of respective channels ($\lambda b1-\lambda N$, $\lambda r1-\lambda rN$) and the demultiplexers 212,216 are used to subsequently demultiplex the channels.

As depicted within FIG. 2, coupled between the first WDM coupler 206 and the first fiber 202 is a blue post/red pre amplifier 218 and coupled between the second fiber 204 and the second WDM coupler 208 is a blue pre/red post amplifier 220. Further, as depicted in FIG. 2, coupled between the fibers 202,204 is a bidirectional in-line repeater 222. It can be seen from FIG. 2 that there is a blue and red transmission path which respectively traverse blue multiplexer 210, WDM coupler 206, blue postamplifier 218, fiber 202, repeater 222, fiber 204, blue preamplifier 220, WDM coupler 208, and blue demultiplexer 216; and traverse red mulitplexer 214, WDM coupler 208, red postamplifier 220, fiber 204, repeater 222, fiber 202, red preamplifier 218, WDM coupler 206, and red demultiplexer 212. One skilled in the art would understand that the key differentiating feature between the red and blue paths is the transmission wavelengths of the corresponding WDM channels, those being in one sample case between 1528 to 1542 nm for the blue path and 1547 to 1561 nm for the red path.

One skilled in the art would understand that the bidirectional repeater 222 of FIG. 2 has similar problems as discussed herein above with respect to the unidirectional repeater 114, hence requiring an equalization technique to be implemented in the bidirectional system. The complexity of such an equalization technique in a bidirectional WDM system increases compared with that in a unidirectional WDM system.

Hence, an improvement in both unidirectional and bidirectional optical fiber communication systems is required that equalizes the OSNRs of the WDM channels in a more efficient manner. Preferably this improvement would reduce the number of iterations required and the dynamic range of the transmission power adjusters. As well, this improvement would preferably not require a significant redesign of the amplifier system, but possibly could take advantage of advancements in two-stage optical fiber amplifier technology to allow for a reduced implementation cost.

SUMMARY OF THE INVENTION

It is an object of the present invention to overcome at least one of the disadvantages of the prior art and, in an exemplary embodiment, to provide a system and method by which the equalization of WDM channels is performed more efficiently.

The present invention, in one broad aspect, is a method of reducing the difference in gain experienced by Wavelength Division Multiplexed (WDM) channels that are input to an amplifier. This method includes the step of adjusting the amplifier's input signal power relative to the amplifier's pump power. Preferably, this method further includes the step of adjusting the transmit power of the WDM channels to aid in an equalization of the WDM channels.

The present invention, in a second broad aspect, is an amplifying apparatus that includes an attenuator and an amplifier. The attenuator receives signals including WDM channels and outputs attenuated versions of the received signals. The amplifier then receives the attenuated signals, amplifies them such that the WDM channels are amplified by different amounts, and outputs amplified signals. The attenuator adjusts the amplifier's input signal power relative to the amplifier's pump power to reduce the difference in gain experienced by the individual WDM channels.

In preferred embodiments, the amplifying apparatus includes amplifying modules which each consist of a coupler, a first amplifier having an input attached to the coupler, and a second amplifier having an output coupled to the coupler. These two amplifying modules are coupled together in these preferred embodiments such that the output from the first amplifier within one module is coupled to the input of the second amplifier within the other module, with an attenuator coupled in between.

The present invention, in a third broad aspect, is a WDM optical fiber communication system that includes at least one of the amplifying apparatuses of the first broad aspect. This communication system further includes a WDM multiplexer that combines a plurality of input signals into a WDM signal, a demultiplexer that separates the WDM signal into a plurality of output signals, and a number of optical fibers that connect the amplifying apparatus between the multiplexer and demultiplexer.

In preferred embodiments, the WDM optical fiber communication system is expanded to include the amplifying apparatus according to the above described preferable embodiment. In this expanded system, there is a multiplexer and demultiplexer for each direction with couplers combining the channels of the two directions for transmission on the optical fibers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention is described with reference to the following figures, in which.

DETAILED DESCRIPTION OF THE PREFERRED EMBODIMENTS

Although a preferred embodiment of the present invention is described in detail herein below for a specific optical fiber communication system, it should be understood that the scope of the present invention is not meant to be limited to such an embodiment. In particular, despite the present invention being conceived of to compensate for problems with EDFA amplifiers, it can be seen that the present invention could further be used with amplifiers that have similar characteristics.

Figure 2:
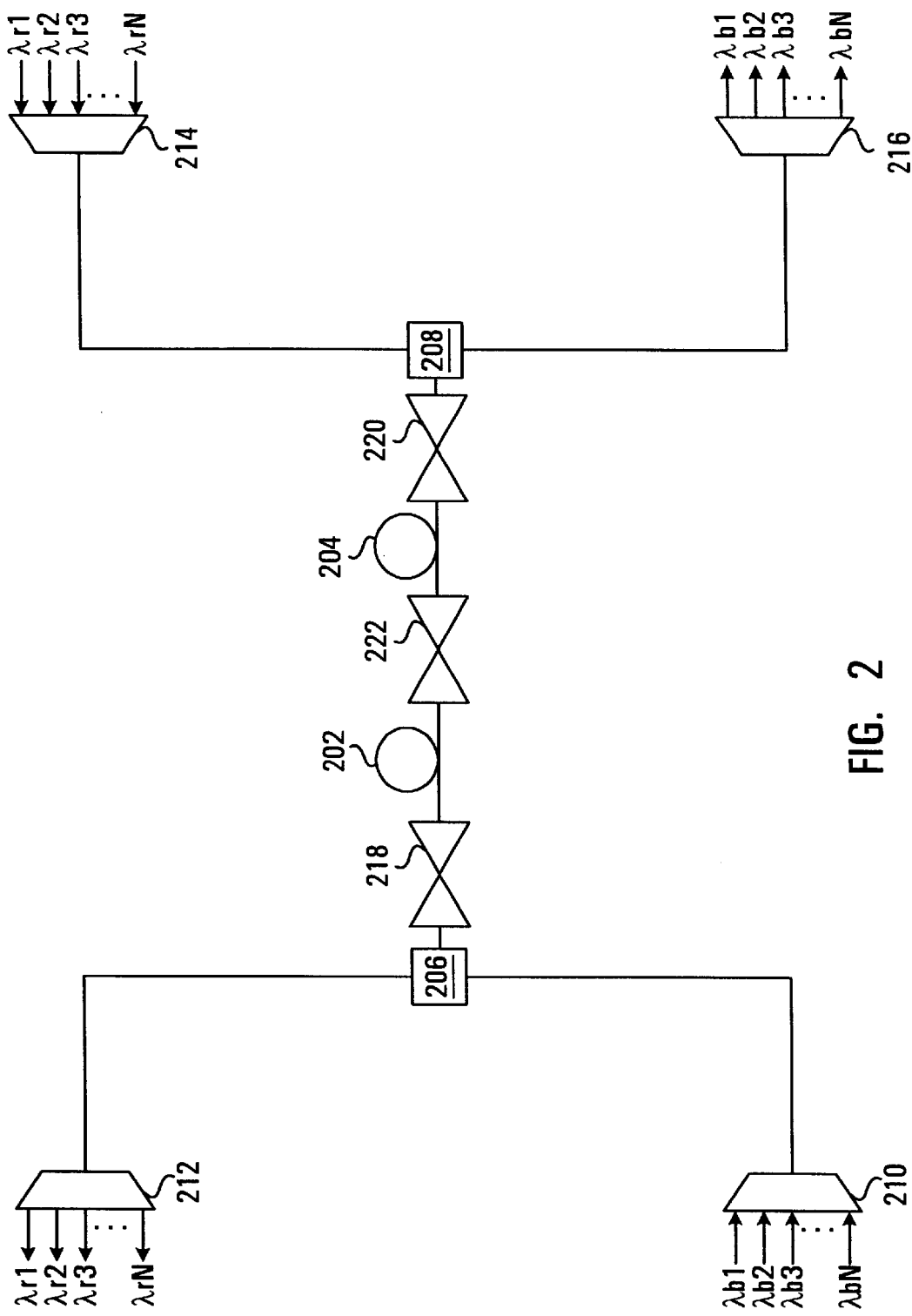
FIG. 2 is a block diagram of a typical bidirectional WDM optical fiber communication system.
Figure 3:
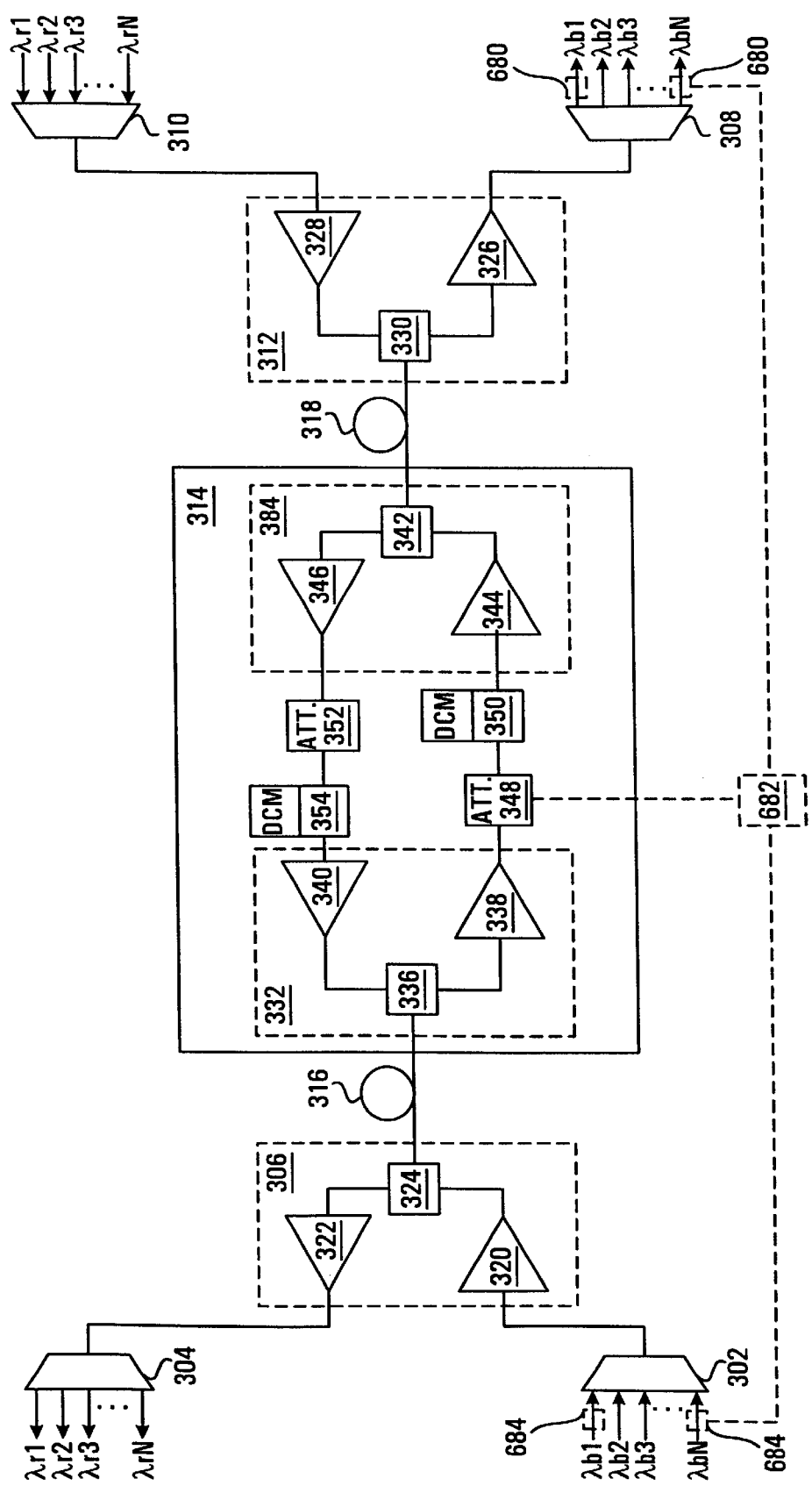
FIG. 3 is a block diagram of a bidirectional WDM optical fiber communication system according to a preferred embodiment of the present invention.

A preferred embodiment of the present invention is now described with reference to FIG. 3. In this figure, a bidirectional optical fiber communication system is depicted which is modified from the bidirectional communication system of FIG. 2. In FIG. 3, the communication system comprises a blue band signal multiplexer 302 and a red band signal demultiplexer 304 coupled to a blue post/red pre amplifier module 306; a blue band signal demultiplexer 308 and a red band signal multiplexer 310 coupled to a blue pre/red post amplifier module 312; and an in-line repeater 314 coupled to the blue post/red pre and blue pre/red post amplifier modules 306,312 via first and second optical fibers 316,318 respectively.

The blue post/red pre amplifier module 306 comprises a blue EDFA postamplifier 320 coupled to the output of the blue band signal multiplexer 302, a red EDFA preamplifier 322 coupled to the input of the red band signal demultiplexer 304, and a first WDM coupler 324 coupled to the first fiber 316, the blue postamplifier 320, and the red preamplifier 322. Similarly, the blue pre/red post amplifier module 312 comprises a blue EDFA preamplifier 326 coupled to the input of the blue band signal demultiplexer 308, a red EDFA postamplifier 328 coupled to the output of the red band signal multiplexer 310, and a second WDM coupler 330 coupled to the second fiber 318, the blue preamplifier 326, and the red postamplifier 328.

The in-line repeater 314 comprises in-line blue pre/red post and in-line blue post/red pre amplifier modules 332,334 coupled to the first and second fibers 316,318 respectively and further coupled together. The in-line blue pre/red post amplifier module 332 comprises a third WDM coupler 336 coupled to the first fiber 316, and in-line blue pre and in-line red post EDFA amplifiers 338,340 coupled to the third WDM coupler 336. The in-line blue post/red pre amplifier module 334 similarly comprises a fourth WDM coupler 342 coupled to the second fiber 318, and in-line blue post and in-line red pre EDFA amplifiers 344,346 coupled to the fourth WDM coupler 342. According to a preferred embodiment, an in-line blue attenuator 348 and an in-line blue Dispersion Compensation Module (DCM) 350 are coupled in series between the in-line blue pre and in-line blue post amplifiers 338,344 which can be seen as first and second amplifying stages of a two-stage amplifier. As well, an in-line red attenuator 352 and an in-line red DCM 354 are coupled in series between the in-line red pre and in-line red post amplifiers 346,340 which can also be considered together as a two-stage amplifier. The implementation of the attenuators 348,352 are described in more detail herein below.

Therefore, the blue communication path for transmitting blue channels (λb1–λbN) from the blue band signal multiplexer 302 to the blue band signal demultiplexer 308 consists of, in the preferred embodiment depicted in FIG. 3, the blue preamplifier 320, the first WDM coupler 324, the fiber 316, the third WDM coupler 336, the in-line blue preamplifier 338, the in-line blue attenuator 348, the in-line blue DCM 350, the in-line blue postamplifier 344, the fourth WDM coupler 342, the second fiber 318, the second WDM coupler 330, and the blue postamplifier 326. The red communication path for transmitting red channels (λr1–λrN) from the red band signal multiplexer 310 to the red band signal demultiplexer 304 consists of similar components but in the opposite direction.

In one alternative embodiment, an Optical Add/Drop Multiplexer (OADM) can be added between the in-line blue pre and post amplifiers 338,344 and/or between the in-line red pre and post amplifiers 346,340. In yet another alternative embodiment, at least one of the in-line blue and red DCMs 350,354 can be removed, hence leaving only the in-line blue and red attenuators 348,352 between the in-line amplifier modules 332,334. One skilled in the art would further understand that although FIG. 3 only depicts one in-line repeater it would be understood that in practical applications a plurality of in-line repeaters similar to the in-line repeater 314 may be implemented within the fibers 316,318.

The key to the present invention is the addition of the attenuators 348,352 within the in-line repeater 314. As will be described herein below, the addition and adjustment of these attenuators 348,352 can result in a more time efficient equalization process by compensating for the non-uniform gain ripple within the in-line EDFA amplifiers. As well, the addition and adjustment of the attenuators 348,352 can also reduce the transmission power adjustment range required when utilizing the known equalization technique described previously, which can result in an overall cost reduction by simplifying the transmission power adjusters. The addition and adjustment of the attenuators preferably causes the OSNRs of individual channels to become closer in value as will be described herein below in detail, hence reducing the required number of iterations of transmission power adjustments to equalize the output powers of the individual channels and the effective dynamic range needed for the adjustments.

In a preferred embodiment, the attenuators 348,352 are well known components that can be manually or automatically adjusted. In other embodiments, the desired values for the attenuators are determined or estimated prior to their implementation and therefore no adjustment of the attenuators is performed. It is further contemplated that an exemplary embodiment of the present invention would utilize tunable attenuators with an RS232 or Ethernet interface that are controlled by a remote controller. The remote controller makes it unnecessary for a human operator to physically change the components in order to adjust the attenuation values.

The theoretical principles of the preferred embodiments of the present invention will now be described. An analytical model of an EDFA amplifier can be considered as follows:

$$G(\lambda) = 4.34 * L * \left[ (\alpha(\lambda) + g(\lambda)) \frac{<\eta_2>}{n_t} - \alpha(\lambda) \right] \quad (1)$$

where $G(\lambda)$ is the fiber amplifier gain in dB at wavelength $\lambda$; L is the erbium-doped fiber length; $\alpha(\lambda)$ and $g(\lambda)$ are the absorption and gain coefficients of the erbium-doped fiber respectively; $n_t$ is the total density of erbium ions which consists of both ground and metastable states; and $<\eta_2>$ is the metastable population average along the length of the fiber amplifier. Further, the theoretical calculation to determine $<\eta_2>$ can be performed as follows:

$$<\eta_2> = \frac{1}{L} \int_0^L \eta_2(z) dz \quad (2)$$

$$= \frac{1}{L} \int_0^L \frac{\sum_k \tau \frac{\sigma_{ak}}{h \nu_k} I_k(z)}{1 + \sum_k \tau \frac{(\sigma_{ak} + \sigma_{ek})}{h \nu_k} I_k(z)} dz$$

where $\eta_2(z)$ is the local metastable population; $\tau$ is the lifetime of the metastable level; h is the Planck's constant; $\nu_k$ is the frequency of optical beam k; $I_k$ is the light intensity of the beam k; and $\sigma_{ak}$ and $\sigma_{ek}$ are absorption and emission cross-section spectra for optical beam k, respectively. One skilled in the art would understand that formula (2) indicates that $<\eta_2>$ is determined by the pump power of the particular fiber amplifier used and the signal power level input to the fiber amplifier. As the input signal power decreases and/or the pump power increases, $<\eta_2>$ increases. It can be shown that the maximum $<\eta_2>$ value is $n_t$ while the minimum $<\eta_2>$ value is zero.

A signal gain difference $\Delta G$ between wavelengths $\lambda 1$ and $\lambda 2$ can be determined using formula (1) as follows:

$$\Delta G = G(\lambda 1) - G(\lambda 2) \quad (3)$$

$$= 4.34 * L * \left\{ \frac{<\eta_2>}{n_t} [(\alpha(\lambda 1) - \alpha(\lambda 2) + g(\lambda 1) - g(\lambda 2)] - [\alpha(\lambda 1) - \alpha(\lambda 2)] \right\}$$

Assuming that $\lambda 1 < \lambda 2$, it is typical in a normal erbium-doped fiber spectra for $\Delta(\lambda 1) > \alpha(\lambda 2)$ and $g(\lambda 1) > g(\lambda 2)$. Therefore, if the pump power is strong enough and the input signal power is very low, $\langle\eta_2\rangle$ will be approximately equal to $n_t$ and the gain difference $\Delta G$ will be:

$$\Delta G = G(\lambda 1) - G(\lambda 2) \approx 4.34 * L * [g(\lambda 1) - g(\lambda 2)] > 0 \quad (4)$$

On the other hand, if the pump power is too weak and the input signal is too strong, $\langle\eta_2\rangle$ will be approximately equal to zero and the gain difference $\Delta G$ will be:

$$\Delta G = G(\lambda 1) - G(\lambda 2) \approx 4.34 * L * \{-[\alpha(\lambda 1) - \alpha(\lambda 2)]\} < 0 \quad (5)$$

Therefore, if the pump power and the input signal power are carefully controlled, $\langle\eta_2\rangle$ can be tuned such that $\Delta G$ will be a particular value. In the case of a one-stage amplifier, $\langle\eta_2\rangle$ should be tuned such that $\Delta G$ becomes approximately zero.

In a two-stage amplifier such as the in-line repeater 314 depicted in FIG. 3, $\langle\eta_2\rangle$ of the second stage amplifier should be tuned such that the $\Delta G$ of the second stage amplifier compensates for the $\Delta G$ of the first stage amplifier. In particular, if the above equations are modelling one stage of a two-stage amplifier, it can be seen that the gain differences at wavelengths $\lambda_1$ and $\lambda_2$ for the first and second stage amplifiers are respectively $\Delta G_1(\lambda_1, \lambda_2)$ and $\Delta G_2(\lambda_1, \lambda_2)$. $\Delta G_1(\lambda_1, \lambda_2)$ is determined by the pump power of the first stage amplifier and by the output signal power at the previous amplifier and the intervening fiber span loss. $\Delta G_2(\lambda_1, \lambda_2)$, on the other hand, can preferably be controlled by an attenuator preceding the second stage amplifier. When this attenuator is carefully controlled, the total gain difference $\Delta G_{total}(\lambda_1, \lambda_2)$ of the two-stage amplifier, that being $\Delta G_1(\lambda_1,\lambda_2) + \Delta G_2(\lambda_1, \lambda_2)$, can be set to approximately zero.

Referring back to the blue communication path within FIG. 3, the input signal power to the in-line blue postamplifier 344 is preferably controlled with the addition of the in-line blue attenuator 348 so that the total gain differences $\Delta G$ between different wavelengths caused by the in-line blue pre/post amplifiers 338,344 is minimized. A similar minimization is preferably performed for the red communication path.

Graphical experimental results generated with the operation of a WDM optical fiber communication system according to one embodiment of the present invention are now shown to illustrate the advantages of the present invention with reference to FIGS. 4a to 4d. The experimental communication system utilized was a 5 span OC-192 Non-Dispersion Shifted Fiber (NDSF) fiber 16 wavelength ($8\lambda$ in blue and $8\lambda$ in red) system with an average span loss of 23 dB. Since the typical loss of NDSF fiber is 0.22 dB/km, the 23 dB loss of each span indicates that each span is over 100 km. In this system, 4 in-line repeaters similar to the in-line repeater 314 were used that each included a two stage amplifier and a tunable attenuator for each band. For simplicity, only the experimental results of the blue band are described herein below.

Figure 4A:
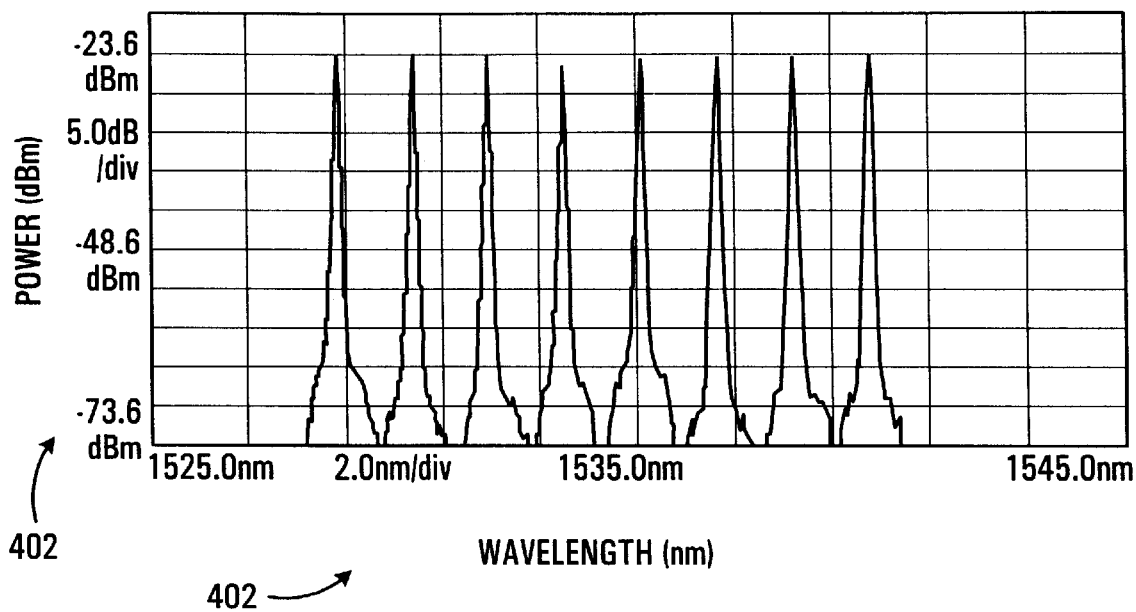
FIG. 4a is a graphical depiction of a power spectrum illustrating WDM channel transmission powers.

Within each of FIGS. 4a to 4d, there is a horizontal axis 402 that represents the range of wavelengths, in units of nm, corresponding to the channels within the WDM communication system and a vertical axis 404 that represents the amplitude of the power, in units of dBm, at the corresponding wavelengths. FIG. 4a depicts a power spectrum illustrating the transmission power for 8 WDM channels directly after the multiplexing stage in the transmitter. It can be seen that these transmission powers are at approximately equal power levels.

Figure 4B:
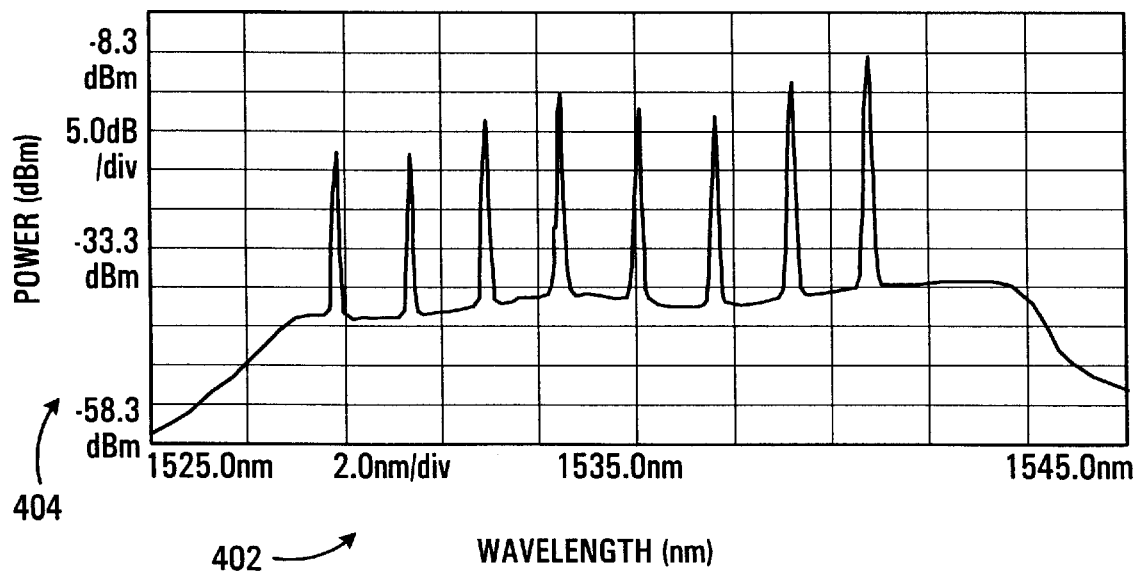
FIGS. 4b, 4c, and 4d are graphical depictions of power spectra illustrating WDM channel powers prior to demultiplexing with different attenuations added to the amplifier stages.
Figure 4C:
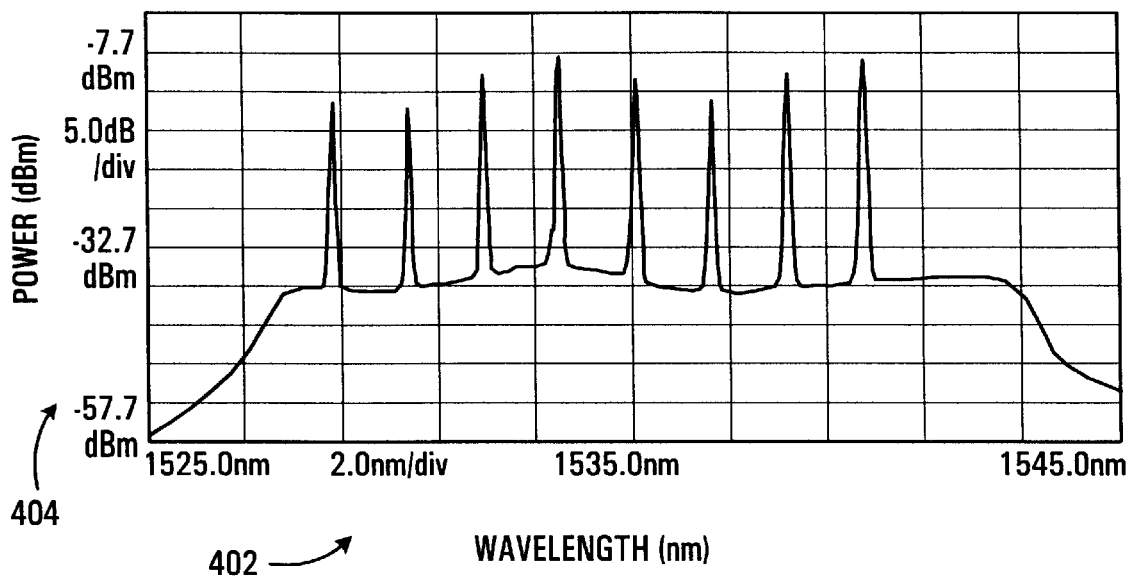
Figure 4D:
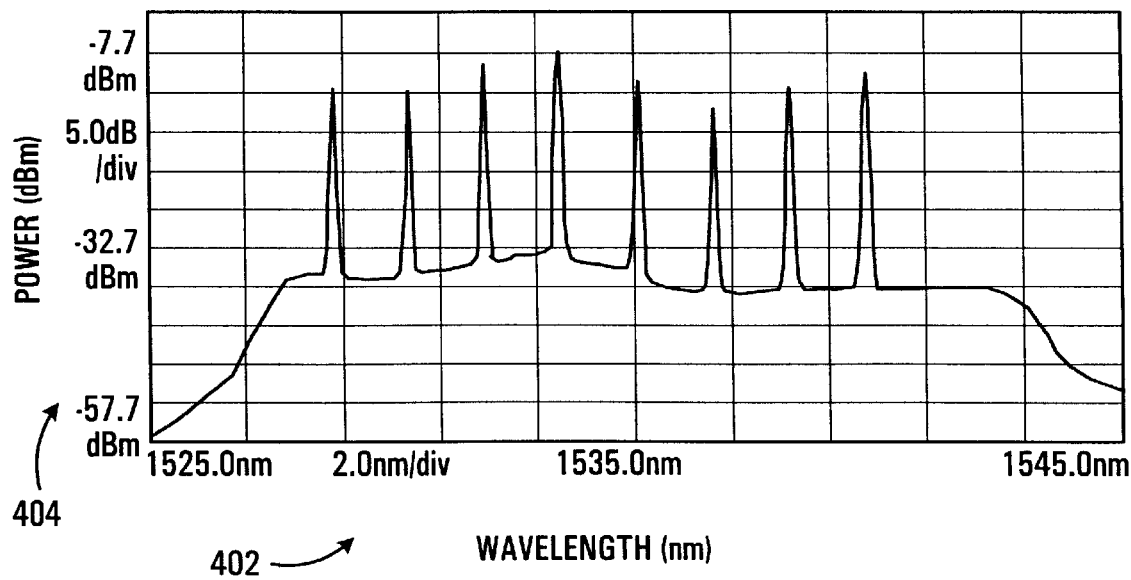

FIGS. 4b to 4d depict power spectra illustrating the power of the transmitted signals directly prior to the demultiplexing stage in the receiver assuming no equalization adjustment has been made. The key difference between the spectra of the individual figures is the level of attenuation that is added by the attenuators between the two amplifier stages within the in-line repeaters.

In FIG. 4b, each of the attenuators add 11 dB of attenuation to the signal. It is apparent that there is a serious ripple in the peak powers for the channels due to the non-uniform nature of the amplifiers within the pre/post amplifiers and the amplifiers within the in-line repeaters. In the case shown in FIG. 4b, the OSNR values for the channels range from 20.3 to 29.2 dB. It is noted that the known setup in which there is no attenuation added would result in an even wider distribution range of OSNR values for the channels. In FIG. 4c, the attenuation is increased to 15 dB at each attenuator. This results in a range of OSNR values for the channels from 22.9 to 28.6 dB. In FIG. 4d, the attenuation is increased once again to 19 dB. This results in a range of OSNR values for the channels from 23.2 to 27.3 dB. Therefore, by increasing the attenuation from 11 dB to 19 dB the minimum OSNR value is increased from 20.3 to 23.2 dB and the maximum OSNR difference is decreased from 8.9 to 4.1 dB. At the same time, the amplifier gain ripple is also reduced and the channel power difference becomes smaller.

The spectra of FIGS. 4b to 4d illustrate how changing the attenuation within the in-line repeaters can reduce the range of the OSNR values within the channels by raising the OSNR of the weakest channel and lowering the OSNR of the strongest channel. Since a communication system essentially fails if any one of the channels has an OSNR below an acceptable threshold, the increase of the OSNR of the weakest channel by changing of the attenuation between the two amplifier stages can be seen to reduce the possibility of such a failure; though there are numerous other advantages as will be described herein below.

In the past, OSNR equalization was typically realized by changing the transmitter power for each of the individual WDM channels. According to the preferred embodiments described above, in-line repeaters are implemented such that their attenuators can be adjusted, hence allowing a new second degree of freedom in the equalization process. It is noted, as described previously, that a determination could be made prior to the implementation of the attenuators to determine which attenuators of fixed value to utilize within the in-line repeaters. The key to the preferred embodiments is that the optical amplifier gain ripple becomes smaller due to the attenuation between the two stages of the amplifier, since this will result in a quicker equalization process that utilizes a smaller transmission power dynamic range compared to the transmission power adjust equalization method by itself.

With use of a preferred embodiment of the present invention, the equalization of the OSNR values for the channels can be done more quickly and at a potentially lower cost. To illustrate these advantages, a further experiment was carried out to compare the equalization method using only transmitter power adjustments (Method A) and the equalization method of the preferred embodiments using both transmitter power adjustments and in-line attenuation adjustments (Method B). The experimental communication system utilized was identical to that described previously with $8\lambda$ for the blue band.

Although Method B was simply an experimental method in which the power adjustments and in-line attenuation adjustments were carried out by a human operator, it is contemplated that the method could be carried out automatically without human intervention. As indicated hereinabove, tunable attenuators would be controlled by a remote controller. Also, the same remote controller could be used to control the transmission power of the input signals. As would be readily understood by a person skilled in the art, the control feedback loop would take the form illustrated in chain-dotted lines in FIG. 3. Specifically, power detectors 680 located at the outputs of blue band demaltiplexer 308 are connected to a controller 682 which in turn is connected to the tunable attenuator 348 and to power adjustors 684 on the inputs of the blue band multiplexer 302. A similar control arrangement (not shown) would be connected on the red band side.

Summaries of the results can be seen in Table 1 below as well as in FIG. 5 described in detail herein below.

TABLE 1

| Method | Adjust. Time (min) | Maximum Tx Power Adjust. (dB) | OSNR Minimum (dB) | OSNR Average (dB) | ΔOSNR (dB) |
|---|---|---|---|---|---|
| A | 12 | −9.1 | 25.5 | 25.9 | 0.6 |
| B | 6 | −4.9 | 26.2 | 26.4 | 0.6 |

From the experiment, it was found that the equalization method of Method A required 3 iterations of transmission power adjustments. Each iteration takes approximately 30 seconds for each channel's transmission power adjustment. Hence, it can be seen that the equalization process would take (3*number of channels*time for one iteration) approximately 12 minutes as depicted in Table 1. In the case that Method B, which is consistent with the preferred embodiments of the present invention, is utilized, the equalization was found to require a single transmission power adjustment iteration and a single adjustment of the attenuation within the in-line repeaters. Each transmission power and attenuation adjustment takes approximately 30 seconds. Hence, since there are three in-line repeaters, the equalization process would take ((1*number of channels+1*number of in-line repeaters)*time for one iteration) approximately 6 minutes as depicted within Table 1. This reduced time between equalization methods becomes more significant as the communication system increases in the number of channels. Hence, in the future, the implementation of attenuation adjustment according to preferred embodiments of the present invention will allow for significantly reduced equalization times.

The implementation of the preferred embodiments of the present invention can also reduce costs in a WDM communication system due to the reduced dynamic range required to adjust the transmission power for each of the WDM channels. This can be seen in Table 1 for the experiment performed as the maximum transmission power adjustment is reduced from 9.1 dB with the well-known Method A to 4.9 dB with the Method B of the preferred embodiments. This is further illustrated in detail with reference to FIG. 5.

Figure 5:
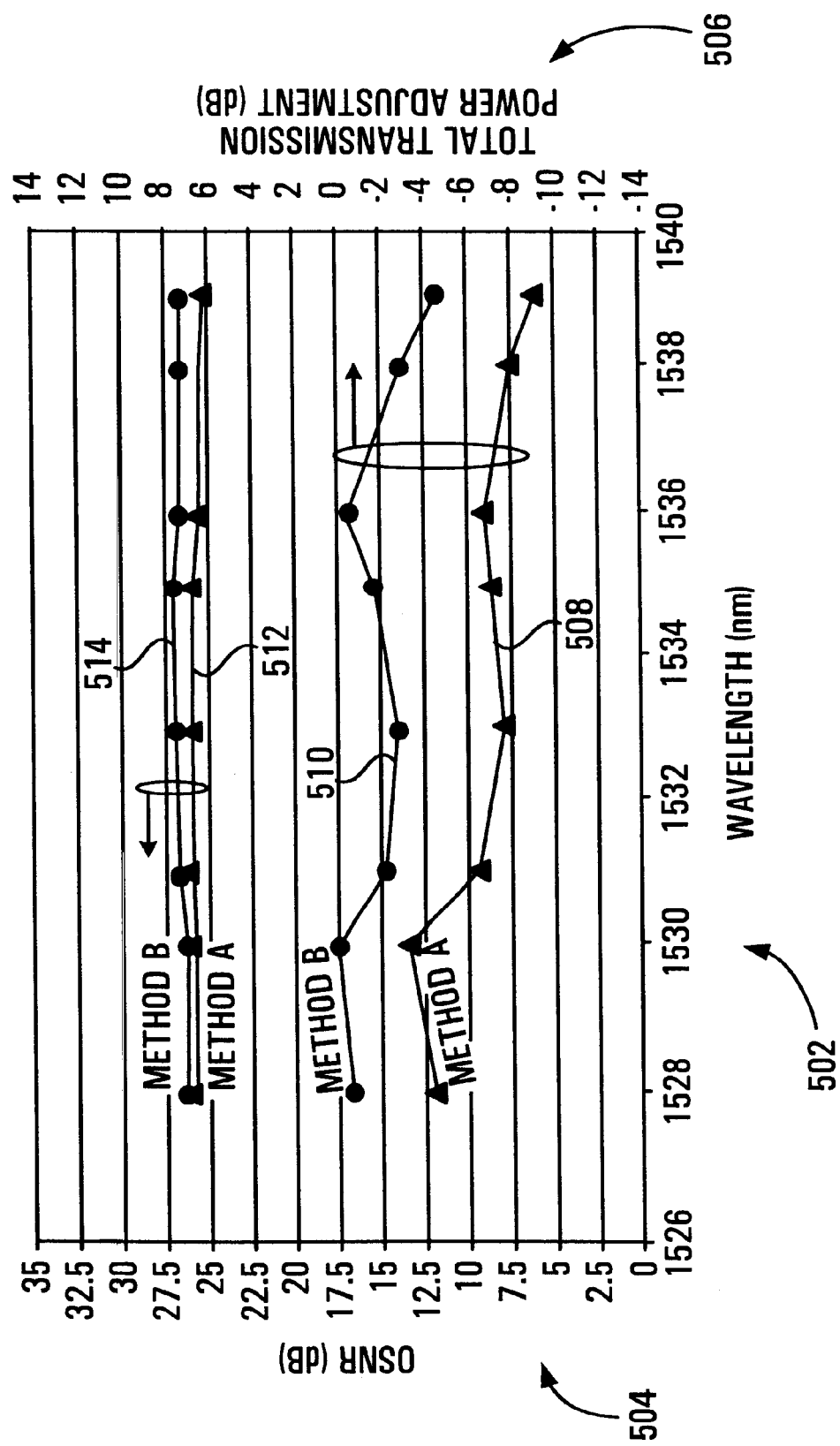
FIG. 5 is a graphical depiction of a comparison between a well-known equalization method and an equalization method according to a preferred embodiment of the present invention.

FIG. 5 is a graphical illustration that compares the Methods A and B in terms of the OSNR and total transmission power adjustment required at each wavelength of the 8λ blue band. Within FIG. 5, there is a horizontal axis 502 that represents the range of wavelengths, in units of nm, corresponding to the channels within the WDM communication system, a first vertical axis 504 that represents the OSNR, in units of dB, at the corresponding wavelengths, and a second vertical axis 506 that represents the total transmission power adjustment, in units of dB, at the corresponding wavelengths. Also depicted on FIG. 5 are lines 508,510 which represent the total transmission power adjustment required at particular wavelengths for Method A and B respectively and lines 512,514 which represent the OSNR at particular wavelengths for Method A and B respectively.

As can be seen from the lines 508,510, Method B, which is the equalization method according to the preferred embodiments, requires significantly less transmission power adjustment in terms of dB for each channel than does Method A which has previously been implemented. Hence, unlike within the well known equalization setups, the transmitter does not require complex and expensive modifications to adjust for large ranges of OSNRs corresponding to the WDM channels at the receiver. At the same time, the lines 512,514 show that the resulting OSNR for the individual channels using the two methods are close, but Method B of the preferred embodiments slightly improves the OSNRs for each wavelength in this experimental system.

Although a preferred embodiment of the present invention is described with reference to FIG. 3 in which a bidirectional optical fiber communication system is implemented with use of amplifier modules 306,312,332,334, the scope of the present invention should not be limited to such an implementation. There are numerous alternative embodiments that can be contemplated in which an attenuator is used to aid in the equalization of WDM channels within an optical fiber communication system that utilizes non-uniform optical amplifiers.

Figure 1:
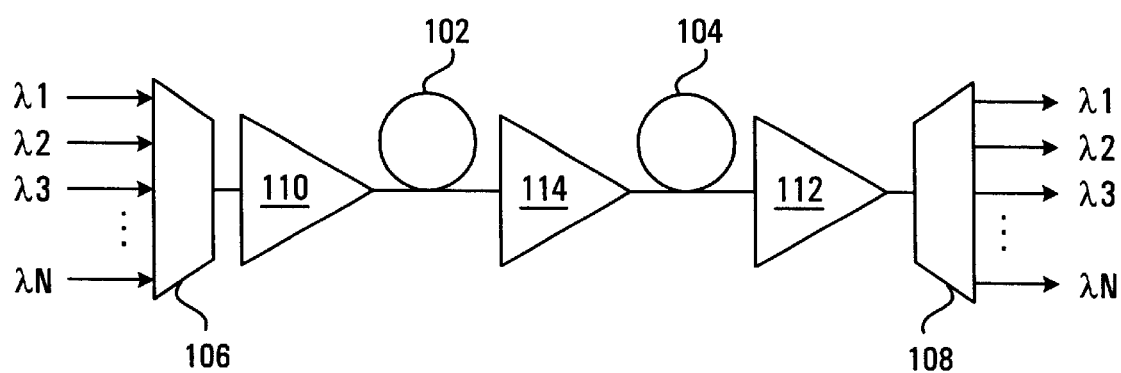
FIG. 1 is a block diagram of a typical unidirectional WDM optical fiber communication system.
Figure 6:
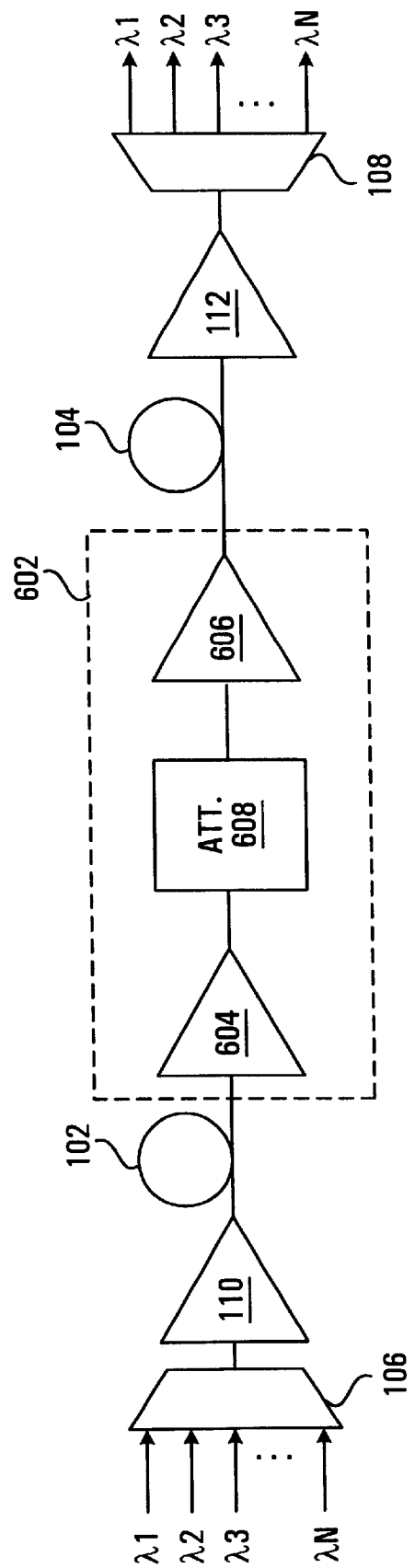
FIG. 6 is a block diagram of a unidirectional WDM optical fiber communication system according to an alternative embodiment of the present invention.

For instance, the unidirectional communication system depicted in FIG. 1 could be expanded into an embodiment of the present invention as shown in FIG. 6. In this system, similar to FIG. 1, the multiplexer 106 is coupled to the demultiplexer 108 via the optical fibers 102,104 and the post/pre amplifiers 110,112. However, instead of the in-line repeater simply comprising a single EDFA amplifier 110, the in-line repeater 602 depicted in FIG. 6 comprises first and second stage EDFA amplifiers 604,606 and an in-line attenuator 608 coupled between the amplifiers 604,606. The operation of the optical fiber communication system of FIG. 6 can be seen to have some of the same benefits to that of the preferred embodiment depicted in FIG. 3.

Figure 7:
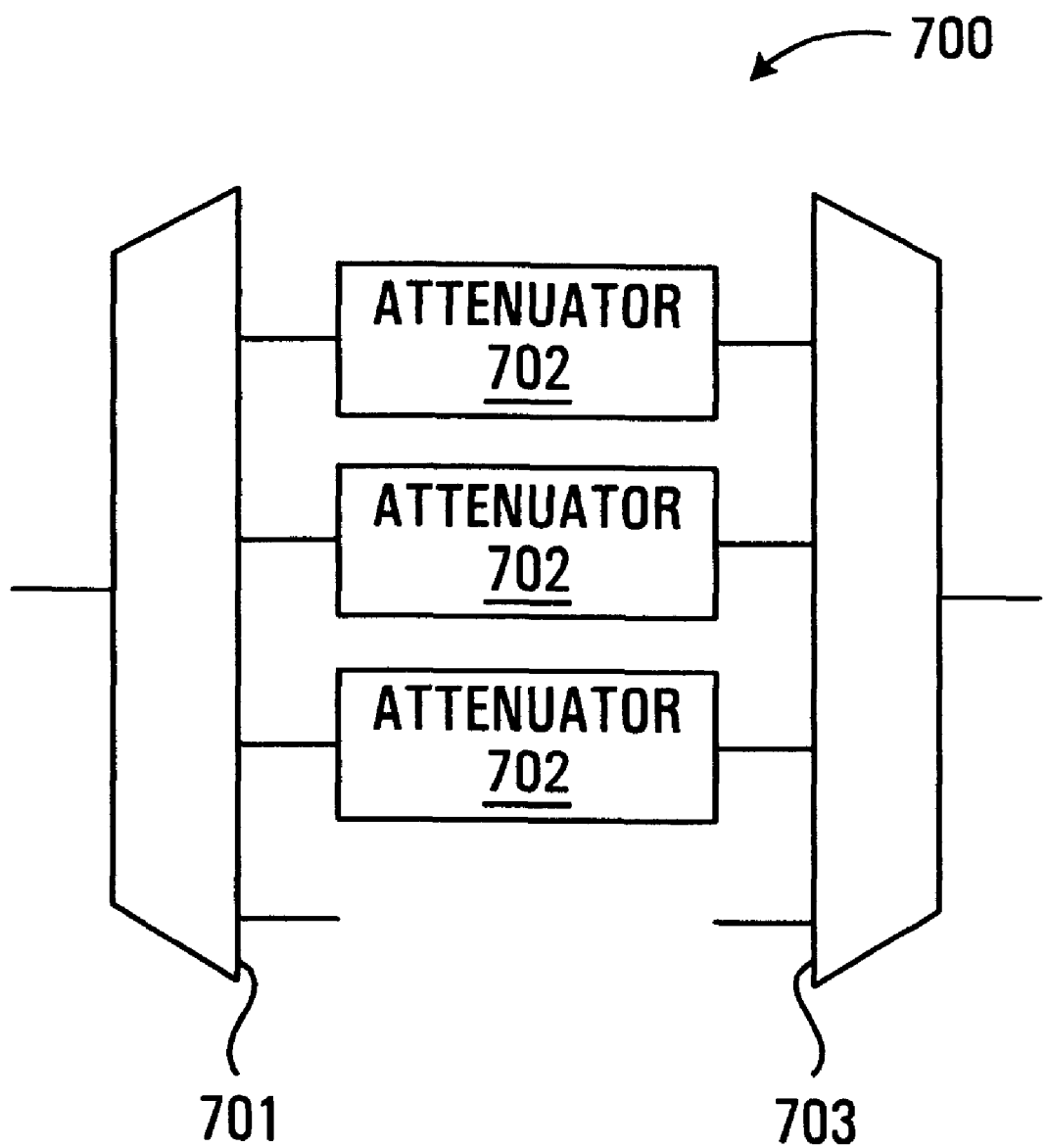
FIG. 7 is a block diagram illustrating an alternative embodiment of attenuation apparatus used in the invention.

Further alternative embodiments of the present invention are contemplated that allow for a plurality of attenuators to be implemented such that the signal power of each individual WDM channel can be adjusted independently. Preferably, these alternative embodiments replace the attenuators 348,354,608 depicted within FIGS. 3 and 6 with corresponding attenuation apparatuses. FIG. 7 illustrates an attenuation apparatus 700 which could replace each of the attenuators 348, 354 and 608. Each attenuation apparatus 700, according to these preferable alternatives, comprises a demultiplexer 701 that separates the individual WDM channels; a plurality of attenuators 702, each attenuating a corresponding WDM channel; and a multiplexer 703 that combines the attenuated WDM channels. This alternative embodiment can allow for the signal power input to an EDFA amplifier for each WDM channel to be independently adjusted relative to the amplifier's pump power. This modification can further reduce the difference in the channels' gains caused by the non-uniform nature of the EDFA amplifiers.

Persons skilled in the art will appreciate that there are yet more alternative implementations and modifications possible to implement an attenuator within an optical fiber communication system, and that the above implementation is only an illustration of this embodiment of the invention. The scope of the invention, therefore, is only to be limited by the claims appended hereto.

What is claimed is:

1. An amplifying apparatus comprising:
   a first amplifying module comprising a first coupler that is operable to receive a first signal comprising a plurality of first Wavelength Division Multiplexed (WDM) channels from a first optical fiber, a first amplifier having an input coupled to the first coupler, and a second amplifier having an output coupled to the first coupler;

a second amplifying module comprising a second coupler that is operable to receive a second signal comprising a plurality of second WDM channels from a second optical fiber, a third amplifier having an output coupled to the second coupler, and a fourth amplifier having an input coupled to the second coupler;

a first attenuator coupled in series between an output of the first amplifier and an input of the third amplifier; and a second attenuator coupled in series between an output of the fourth amplifier and an input of the second amplifier;

whereby the first attenuator adjusts an input signal power to the third amplifier relative to a pump power of the third amplifier to reduce a difference in gain experienced by the first WDM channels; and whereby the second attenuator adjusts an input signal power to the second amplifier relative to a pump power of the second amplifier to reduce a difference in gain experienced by the second WDM channels.

2. An amplifying apparatus according to claim 1, wherein the first and third amplifiers comprise two halves of a single amplifier for communications in a first direction and the second and fourth amplifiers comprise two halves of a single amplifier for communications in a second direction.

3. An amplifying apparatus according to claim 1, wherein the first, second, third and fourth amplifiers are four distinct amplifiers.

4. An amplifying apparatus according to claim 1, wherein at least one of the first and second attenuators is tunable to a plurality of attenuation levels.

5. An amplifying apparatus according to claim 1, further comprising a first dispersion compensation module coupled in series between the first attenuator and the input to the third amplifier, and a second dispersion compensation module coupled in series between the second attenuator and the input to the second amplifier.

6. A Wavelength Division Multiplexed (WDM) optical fiber communication system, incorporating at least one amplifying apparatus according to claim 1, that further comprises:

first and second multiplexers, each operable to receive a plurality of input signals and to output a signal comprising a plurality of WDM channels that correspond to the plurality of input signals;

first and second demultiplexers, each operable to receive a signal comprising a plurality of WDM channels and to output a plurality of output signals corresponding to the WDM channels;

a third coupler coupled to the output of the first multiplexer and the input of the second demultiplexer;

a fourth coupler coupled to the input of the first demultiplexer and the output of the second demultiplexer;

a first optical fiber coupled between the third coupler and the first coupler; and a second optical fiber coupled between the second coupler and the fourth coupler.

7. A WDM optical fiber communication system according to claim 6 further comprising first and second preamplifiers coupled respectively between the first multiplexer and the third coupler, and the second multiplexer and the fourth coupler; and first and second postamplifiers coupled respectively between the fourth coupler and the first demultiplexer, and the third coupler and the second demultiplexer.

8. A WDM optical fiber communication system according to claim 6, wherein the at least one amplifying apparatus comprises a plurality of amplifying apparatuses coupled in series between the first and second optical fibers with additional optical fibers coupled between the amplifying apparatuses.

9. A WDM optical fiber communication system according to claim 6 further comprising first and second power detectors, coupled to each of the output signals from the first and second demultiplexers respectively, that measures power characteristics corresponding to each of the output signals and first and second power adjustors, coupled to each of the input signals to the first and second multiplexers respectively, for adjusting the transmission power of the input signals based upon the corresponding measured power characteristics such that the power characteristics of the output signals become substantially more equal.

10. A WDM optical fiber communication system according to claim 9, wherein the first and second attenuators are each tunable to a plurality of attenuation levels.

11. A WDM optical fiber communication system according to claim 9, further comprising first feedback control loops between the first and second power detectors and the first and second power adjusters for automatically adjusting the transmission power based upon the corresponding measured power characteristics.

12. A WDM optical fiber communication system according to claim 10, further comprising fIrst feedback control loops between the first and second power detectors and the first and second power adjusters for automatically adjusting the transmission power based upon the corresponding measured power characteristics and second feedback control loops between the first and second power detectors and the first and second tunable attenuators respectively.

13. A Wavelength Division Multiplexed (WDM) optical fiber communication system comprising:

a multiplexer that is operable to receive a plurality of input signals and to output a signal comprising a plurality WDM channels that correspond to the plurality of input signals;

a demultiplexer that is operable to receive a signal comprising a plurality of WDM channels and to output a plurality of output signals corresponding to the WDM channels;

at least one amplifying apparatus;

a first optical fiber coupled between the multiplexer and the amplifying apparatus;

a second optical fiber coupled between the amplifying apparatus and the demultiplexer;

a signal power detector coupled to each of the output signals to measure a power characteristic corresponding to each the output signals;

and a power adjuster coupled to each of the input signals for adjusting the transmission power of the input signals based upon the corresponding detected power characteristics in order to equalize the power characteristics;

wherein the amplifying apparatus comprises:

a first amplifier having an input coupled to the first optical fiber;

an attenuator coupled to an output of the first amplifier; and a second amplifier having an input connected to an output of the attenuator and an output connected to the second optical fiber.

14. A WDM optical fiber communication system according to claim 13, wherein the attenuator is tunable to a plurality of attenuation levels.

15. A WDM optical fiber communication system according to claim 13, further comprising a feedback control loop between the signal power detectors and the power adjusters for automatically adjusting the transmission power based upon the detected power characteristics.

16. A WDM optical fiber communication system according to claim 14, further comprising a feedback control loop between the signal power detectors and the power adjusters for automatically adjusting the transmission power based upon the detected power characteristics and a further feedback control loop between the signal power detectors and the tunable attenuator for automatically adjusting the attenuation.

17. A WDM optical fiber communication system according to claim 13 further comprising a preamplifier coupled between the multiplexer and the first optical fiber and a postamplifier coupled between the second optical fiber and the demultiplexer.

18. A WDM optical fiber communication system according to claim 13, wherein the at least one amplifying apparatus comprises a plurality of amplifying apparatuses coupled in series between the first and second optical fibers with additional optical fibers coupled between the amplifying apparatuses.

19. An amplifying apparatus comprising:
   a first amplifier connectable to a first optical fiber comprising a signal comprising a plurality of Wavelength Division Multiplexed (WDM) channels;
   a demultiplexer connected to an output of the first amplifier and operable to separate the first signal into amplified separate WDM channels;
   a plurality of attenuators coupled between the demultiplexer and a multiplexer, each attenuator being located in a respective one of the WDM channels; and
   a second amplifier having an input coupled to an output of the multiplexer and connectable to a second optical fiber.

20. An amplifying apparatus according to claim 19, wherein the attenuators are each tunable to a plurality of attenuation levels.

21. A method of equalizing the gain of a Wavelength Division Multiplexed (WDM) transmission system comprising:
   multiplexing a plurality of input signals to provide a transmit WDM optical signal comprising a plurality of WDM channels that correspond to the plurality of input signals;
   passing the transmit WDM optical signal through a first optical amplifier to provide a first amplified optical signal;
   passing the first amplified optical light through an attenuator to provide an attenuated optical signal;
   passing the attenuated optical signal through a second optical amplifier to provide a second, amplified optical signal;
   demultiplexing the second amplified optical signal into a plurality of output signals corresponding to the plurality of WDM channels;
   detecting a characteristic corresponding to the power of each of the plurality of output signals; and
   adjusting the power of each of the plurality of input signals in a sense to reduce differences in the power of the plurality of output signals.

* * * * *